United States Patent [19]

Holland et al.

[11] Patent Number: 4,765,864
[45] Date of Patent: Aug. 23, 1988

[54] ETCHING METHOD FOR PRODUCING AN ELECTROCHEMICAL CELL IN A CRYSTALLINE SUBSTRATE

[75] Inventors: Christopher E. Holland, Redwood City; Eugene R. Westerberg; Marc J. Madou, both of Palo Alto; Takaaki Otagawa, Fremont, all of Calif.

[73] Assignee: SRI International, Menlo Park, Calif.

[21] Appl. No.: 73,739

[22] Filed: Jul. 15, 1987

[51] Int. Cl.[4] ............... H01L 21/306; B44C 1/22; C03C 15/00; C23F 1/02
[52] U.S. Cl. .................. 156/644; 156/651; 156/653; 156/657; 156/661.1; 156/662; 204/242; 357/55; 357/65; 429/122; 437/203; 437/228
[58] Field of Search ............... 156/644, 648, 651, 653, 156/657, 659.1, 661.1, 662; 357/55, 65, 71, 72; 204/193, 242, 282, 250–252; 429/122, 126; 437/203, 228; 252/79.3, 79.5

[56] References Cited

U.S. PATENT DOCUMENTS 4,234,361 11/1980 Guckel et al. ............... 156/648
4,381,341 4/1983 Przybysz et al. ............ 430/312
4,455,561 6/1984 Boyden et al. .............. 346/140 R
4,601,777 7/1986 Hawkins et al. ............. 156/651 X Primary Examiner—William A. Powell
Attorney, Agent, or Firm—Fliesler, Dubb, Meyer & Lovejoy

[57] ABSTRACT

A method is set forth of constructing an electrochemical cell from a crystalline slab having front and back sides facing generally away from one another. Masking layers are provided covering the front and back sides of the slab and a back resist layer is provided covering the front masking layer, the front and resist layer having at least one opening therethrough exposing a portion of the masking layer therebehind. A passage is etched through the exposed part of the back masking layer and extending into the slab to terminate at the front masking layer. A conductor is deposited in the passage. A second front masking layer is formed covering the front side other than where the passage terminates. The masking layers are etched away opposite the passage sufficiently to expose the conductor. The technology provides electrochemical cells either on or completely below the surface of a slab, for example a silicon slab. Integrated circuitry can be provided on the side of the slab removed from the electrochemistry. A multiplicity of cells can be produced simultaneously on a single slab.

36 Claims, 5 Drawing Sheets

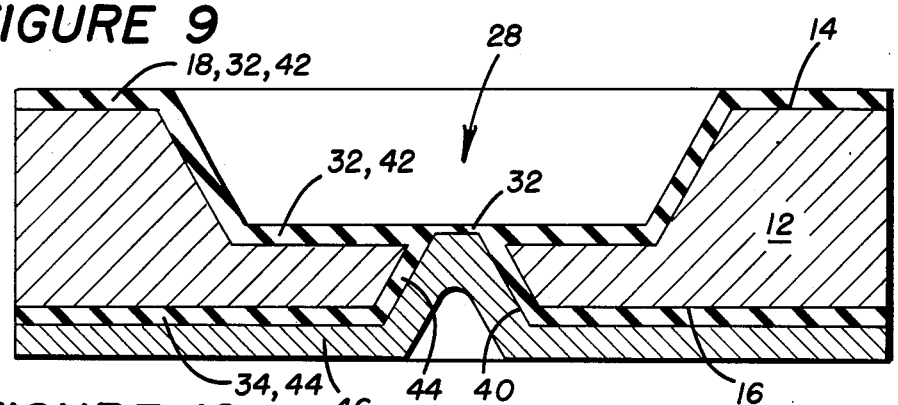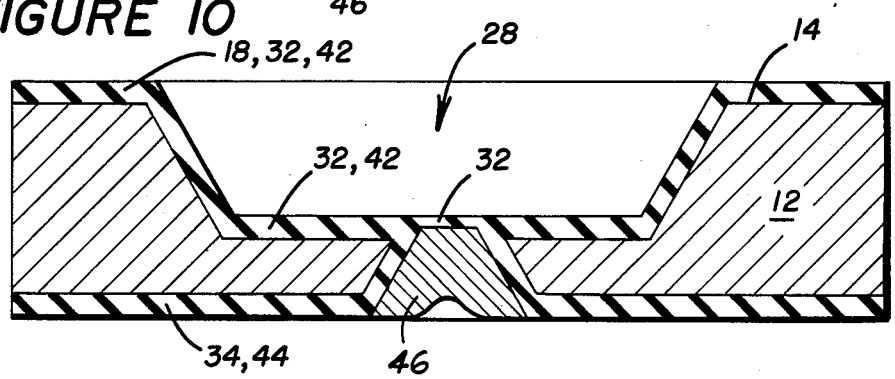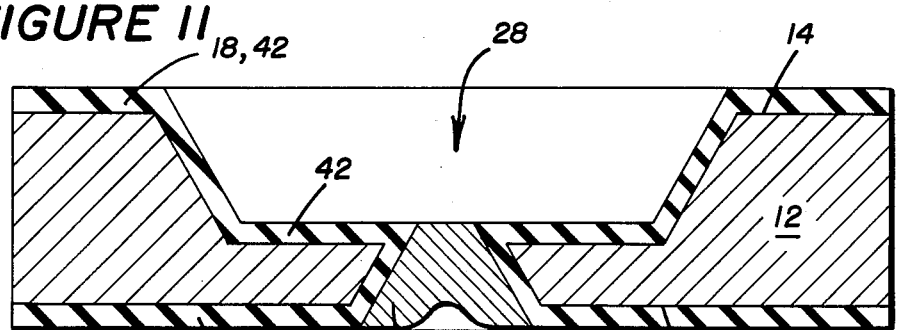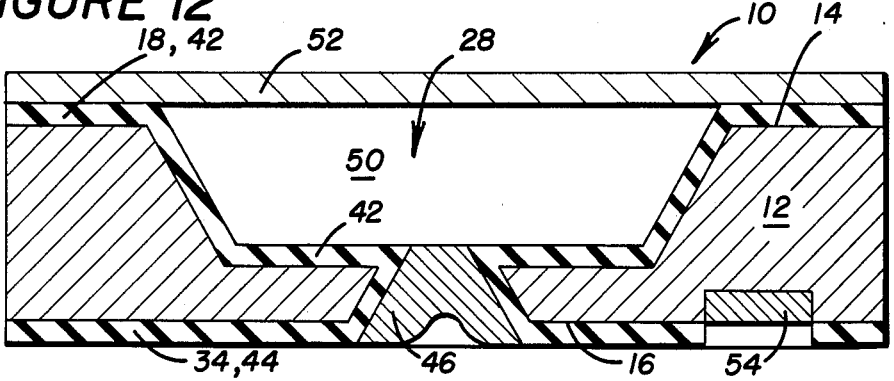

ETCHING METHOD FOR PRODUCING AN ELECTROCHEMICAL CELL IN A CRYSTALLINE SUBSTRATE

DESCRIPTION

TECHNICAL FIELD

The invention relates to a method of constructing an electrochemical cell in a crystalline slab.

BACKGROUND ART

Electrochemical cells have been formed in the past on the surfaces of silicon wafers or slabs. However, such cells have not been made in the past through providing wells which extend into the silicon whereby the entire chemistry of the cell is below the surface of the silicon. Further, such cells have not been made in the past to include connection through the silicon wafer to its back side so as to provide easy access to an integrated circuit which can process the signals developed by the electrochemical cell.

Planar electrochemical cells, with the electrodes and electrolytic medium on one surface of slabs or wafers various materials, including silicon, are known. However, such cells have not been made in the past with the sensing electrode being connected through the slab or wafer to another surface of the slab or wafer whereby easy access is provided to an integrated circuit on or in such other surface and which can process the signals developed by the electorchemical cell.

The present invention is directed to solving one or more of the problems as set forth above.

DISCLOSURE OF INVENTION

In accordance with one embodiment of the present invention a method is set forth of constructing an electrochemical cell in a crystalline slab having front and back sides. The method comprises providing first front and first back masking layers of a first thickness covering, respectively, the front and back sides of the slab and a front resist layer covering the front masking layer, the front resist layer having at least one hole therethrough exposing a portion of the first front masking layer behind it. A well is etched through the exposed portion of the first front masking layer and extends into the slab to a location intermediate the front and back sides. A second front masking layer is formed covering the front side and the well. A back resist layer is provided covering the first back masking layer, the back positive photoresist layer having at least one opening therethrough exposing a part of the first back masking layer behind it, the opening being aligned opposite the well. A passage is etched through the exposed part of the first back masking layer and extending into the slab to terminate at the second front masking layer in the well. A third front masking layer is provided covering the front side and the well other than opposite where the passage terminates at the second front masking layer. A second back masking layer is provided covering the backside and the passage other than where the passage terminates at the second front masking layer. A conductor is deposited in the passage. The second and third front masking layers are etched away sufficiently to expose the conductor.

In accordance with another embodiment of the present invention a method is set forth for forming an electrolytic cell in a silicon slab having front and back sides facing generally away from one another. The method comprises producing a silicon dioxide layer of a first thickness on the front and back sides. A front resist layer is deposited on the silicon dioxide layer on the front side with at least one hole therethrough exposing a portion of the silicon dioxide layer behind it. The exposed portion of the silicon dioxide layer is etched through. A well is etched into the slab beneath where the exposed portion of the silicon dioxide layer has been etched through, the well extending into the slab and ending in a well bottom at a location intermediate the front and back sides of the slab. The first resist layer is removed. The thickness of the silicon dioxide layer is increased and extended to cover the surface of the well, the thickness of the silicon dioxide layer on the surface of the well being less than the thickness of the silicon dioxide layer elsewhere. A back resist layer is deposited on the back side. The back resist layer is developed to produce a resist layer having at least one opening therethrough exposing a part of the silicon dioxide layer behind it, the opening being aligned with the well. The exposed part of the silicon dioxide layer is etched through. A passage is etched into the slab beneath where the exposed part of the silicon dioxide layer has been etched through, the passage extending into the slab to terminate at the silicon dioxide layer in the well. The back resist layer is removed. The thickness of the silicon dioxide layer, other than where the passage terminates, is increased and it is extended to cover the surface of the passage. A conductor is deposited in the passage. The silicon dioxide layer in the well bottom is etched sufficiently to expose the conductor.

In accordance with still another embodiment of the present invention a method is set forth of constructing an electrochemical cell from a crystalline slab having front and back sides facing generally away from one another. The method comprises providing first front and first back masking layers covering, respectively the front and back sides. A back resist layer is provided covering the first back masking layer, the back resist layer having at least one opening therethrough exposing a part of the first back masking layer behind it. A passage is etched through the exposed part of the first back masking layer and extends into the slab to terminate at the first front masking layer. A conductor is deposited in the passage. A second front masking layer is formed covering the front side other than where the passage terminates at the first front masking layer. The first and second front masking layers are etched away sufficient to expose the conductor opposite the passage.

In accordance with still another embodiment of the present invention a method is set forth of forming an electrolytic cell from a silicon slab having front and back sides facing generally away from one another. The method comprises oxidizing the slab to produce a silicon dioxide layer of a first thickness on the front and back sides. A back resist layer is deposited on the back side, the back resist layer having at least one opening therethrough exposing a part of the silicon dioxide layer behind it. The exposed part of the silicon dioxide layer is etched through. A passage is etched into the slab beneath where the exposed part of the silicon dioxide layer has been etched through, the passage extending into the slab to terminate at the silicon dioxide layer on the front side. The back resist layer is removed. The slab is oxidized sufficiently to increase the thickness of the silicon dioxide layer other than where the passage terminates and to extend the silicon dioxide layer to cover the surface of the passage. A conductor is deposited in the passage. The silicon dioxide layer is etched away sufficiently to expose the conductor opposite the passage, the etching being controlled so as to not expose the slab.

The present invention allows use of parallel processing technology whereby a plurality of wells can be produced at the same time and for relatively low cost. The processing steps are relatively non-critical and can be carried out in a straightforward manner. The resulting surfaces of the well and the passage are smooth and well defined. A flat metal contact area is provided as an electrode at the bottom of the well. When the metal is deposited in the passage an indentation normally results adjacent the back side of the slab which is useful for possible connection to contact pins. The resulting structure includes a well which is beneath the surface of the crystalline slab whereby it can be readily filled utilizing technologies similar to ink-jets. This again leads to low cost parallel processing capabilities. Also in accordance with the invention a plurality of passages can be simultaneously etched through from the back side of the crystalline slab to one or more wells so as to provide more than one electrode in each of one or more wells.

BRIEF DESCRIPTION OF DRAWINGS

The present invention will be better understood by reference to the figures of the drawings wherein like numbers denote like parts throughout and wherein:

FIG. 9 illustrates the slab of FIG. 8 having a metal deposited on the back side thereof and into the passage leading to the well bottom;

FIG. 10 illustrates the slab of FIG. 9 after excess metal has been stripped from the back silicon dioxide layer;

FIG. 11 illustrates a completed slab produced by etching of the silicon dioxide layer sufficiently to expose a conductor in the passage to the bottom of the well;

FIG. 12 illustrates a completed electrochemical cell produced as illustrated in FIGS. 1-11 with integrated circuitry on the back side of the slab;

BEST MODE FOR CARRYING OUT INVENTION

In accordance with the present invention a method is set forth of constructing an electrochemical cell 10 as seen in one embodiment in its completed state in FIG. 12. The electrochemical cell 10 is constructed in a crystalline, generally a semiconductor slab 12 with the construction steps being seen in each of FIGS. 1-12. The semiconductor slab 12 has a front surface 14 and a back surface 16.

Figure 1:
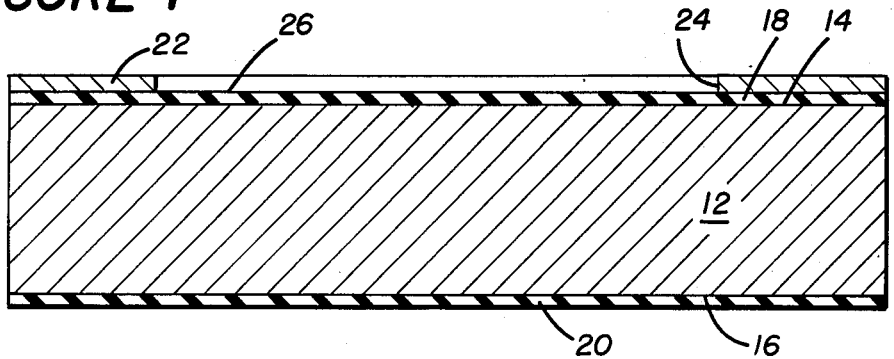
FIG. 1 illustrates a silicon slab having a silicon dioxide layer on the front and back surface thereof with a developed positive photoresist layer on the front silicon dioxide layer.
Figure 2:
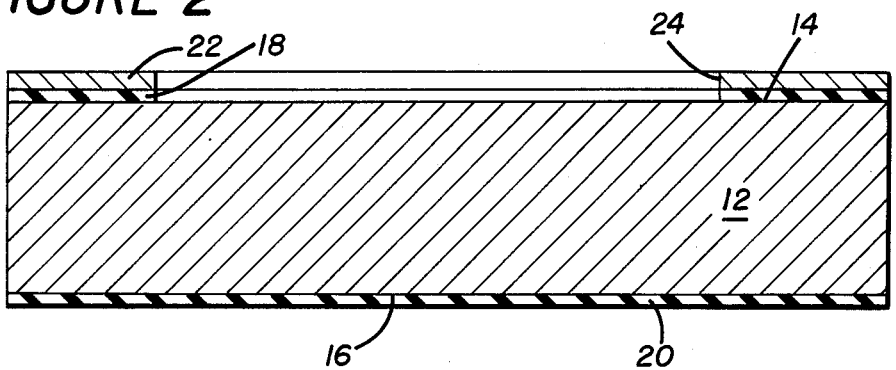
FIG. 2 illustrates the slab of FIG. 1, wherein the silicon dioxide layer has been etched away to expose a portion of the slab.
Figure 3:
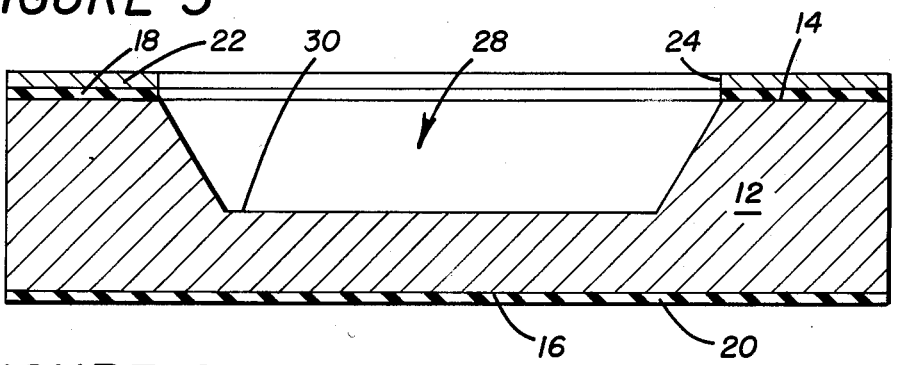
FIG. 3 illustrates the slab of FIG. 2, wherein a well has been anisotropically etched into the silicon wafer.

The method of the invention includes providing first front and first back masking layers 18,20, generally insulative layers 18,20 if the slab 12 is a semiconductor, of a first thickness, covering respectively the front side 14 and the back side 16 of the slab 12. A front resist layer, for example, a positive photoresist layer 22 is provided which covers the first front insulative layer 18. Alternatively, an electron beam or X-ray resist layer may be used. The front positive photoresist layer 22 (but which can be an electron beam or X-ray resist material) has at least one hole 24 therethrough, as seen in FIG. 1, exposing a portion 26 of the front insulative layer 18 therebehind. A well 28 (FIGS. 3-12) is etched through the exposed portion 26 of the first front insulative layer 18 and extends into the slab 12 to a location intermediate the front side 14 and the back side 16. The well 28 ends in a well bottom 30.

Figure 4:
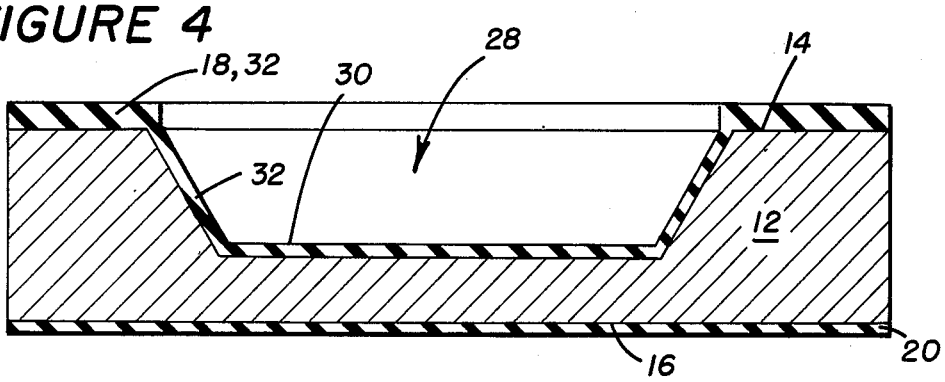
FIG. 4 illustrates the slab of FIG. 3, wherein the slab has been oxidized to provide a silicon dioxide layer extending over the surface of the well.

As may be seen in FIG. 4 a second front insulative layer 32 is formed covering the front side 14 and the well 28, the second front insulative layer 32 being of a second thickness which is lesser than the first thickness. In the embodiment illustrated, those portions of the first insulative layer 18 which were not removed when the well 28 was formed are simply thickened and the first front layer 18 and the second front insulative layer 32 are merged.

Figure 5:
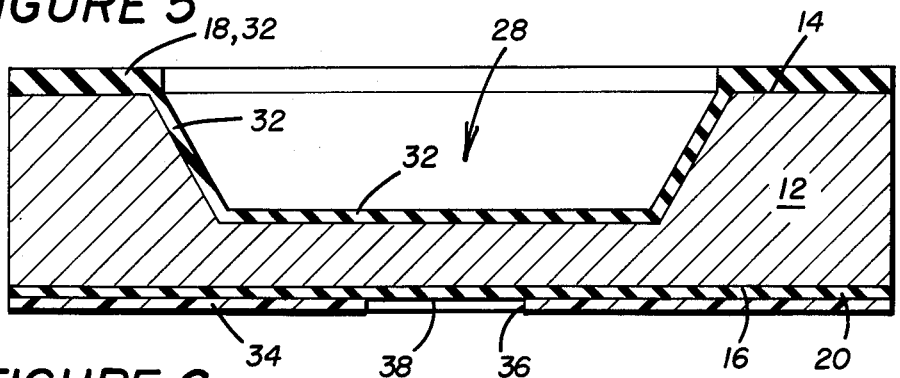
FIG. 5 illustrates the slab of FIG. 4, wherein a positive photoresist layer has been deposited on the back side thereof.
Figure 6:
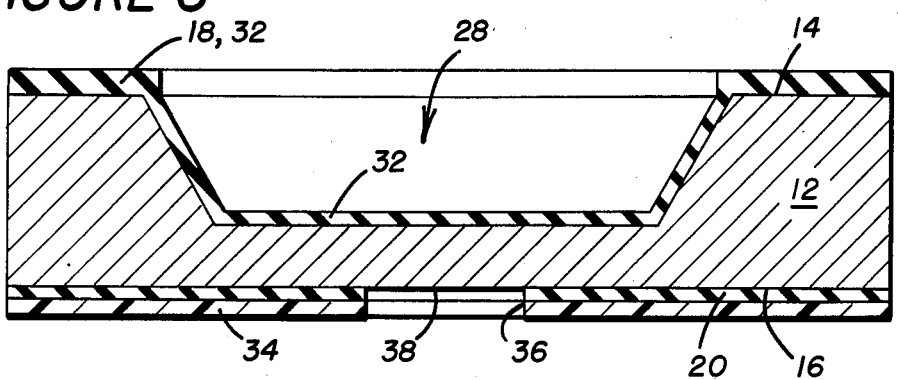
FIG. 6 illustrates the slab of FIG. 5, following etching away of a part of the silicon dioxide layer from the back side.

A back resist layer 34 is provided, as illustrated in FIG. 5, the back resist layer 34 covering the first back insulative layer 20. The back resist layer 34 (FIG. 6) has at least one opening 36 therethrough exposing a part 38 of the first back insulative layer 20 therebehind, the opening 36 being aligned opposite the well 28.

A passage 40 (FIG. 7) is etched through the exposed part 38 of the first back insulative layer 20 (FIG. 6) and extending into the slab 12 to terminate at the second front insulative layer 32 in the well 28.

Figure 8:
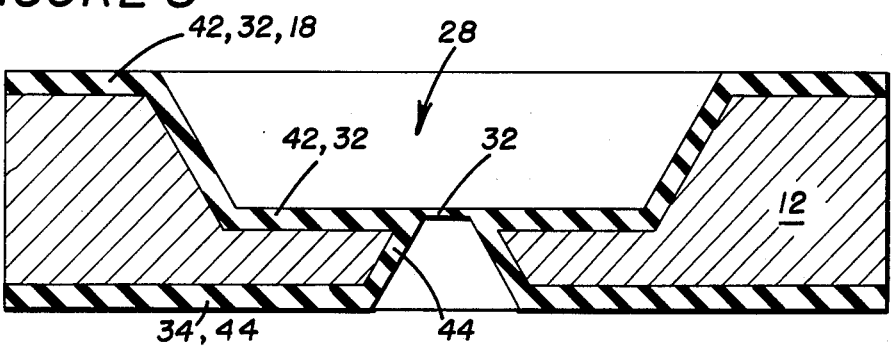
FIG. 8 illustrates the slab of FIG. 7, following further oxidation to thicken the silicon dioxide layer and to oxidize the passage leading to the well bottom.
Figure 13:
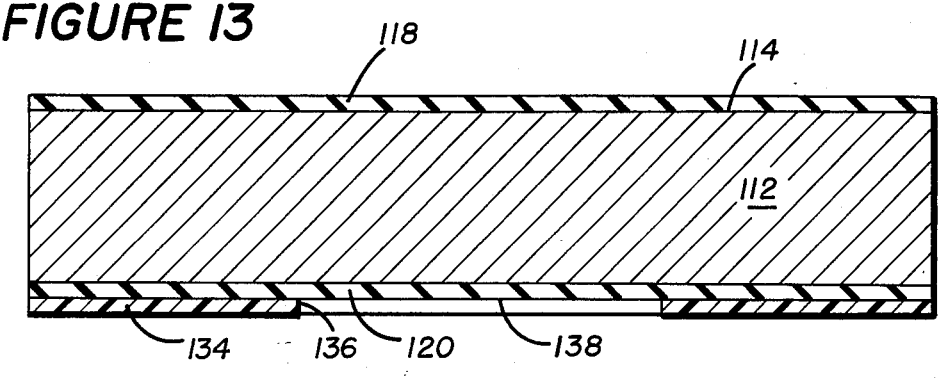
FIG. 13 illustrates a slab wherein a positive photoresist layer has been deposited on the back side thereof.
Figure 14:
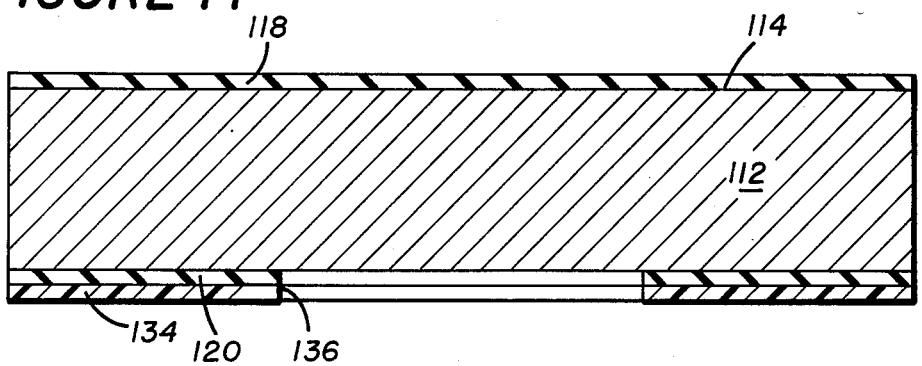
FIG. 14 illustrates the slab of FIG. 13 following etching away of a part of the silicon dioxide layer from the back side.

A third front insulative layer 42 is provided covering the front side 14 and the well 28 other than opposite where the passage 40 terminates at the second front insulative layer 32. In the embodiment illustrated, those portions of the second front insulative layer 32, and those portions of the merged first and second insulative layers 18 and 32 are merged as, for example, the slab 12 is further oxidized to silicon dioxide. Opposite the passage 40 there is no silicon to oxidize so the thickness remains that of the second insulative layer 32. The slab 12 following this step is as illustrated in FIG. 8.

A second back insulative layer 44 is provided covering the back side 16 of the slab 12 and also covering the passage 40 other than where the passage 40 terminates at the second front insulative layer 32. The second back insulative layer 44 is generally formed simultaneously with formation of the third front insulative layer 42 and generally is merged with the first back insulative layer 34.

A conductor 46, seen in FIG. 9, is deposited in the passage 40. This can be accomplished by sputtering, evaporation, or the like.

Excess conductor 46 deposited on the second back insulative layer 44 is removed by patterning with a resist layer and etching the conductor 46 away, or by using lift-off processing wherein the conductor 46 is deposited over a patterned resist layer. The subsequent removal of the resist layer simultaneously removes the conductor material atop the resist leaving only the conductor 46 in contact with the insulative layer, thereby providing a suitably configured conductor 46.

The second front insulative layer 32 is etched away opposite the passage 40 sufficiently to expose the conductor 46, the etching being controlled so as to not etch away sufficient of the second and third insulative layers 32,42 to expose the slab 12.

Usually in accordance with the present invention the slab will comprise silicon and the insulative layers are provided by exposure to oxygen at elevated temperatures, under normal silicon dioxide forming conditions. Or, chemical vapor deposition of silicon nitride or silicon dioxide layers can replace forming silicon dioxide layers by exposure to hot oxygen. Thus, the first, second and third fronts insulative layers 18,32 and 42, are generally, in practice, simply a single layer thickened by successive oxidations or depositions of silicon dioxide or silicon nitride. The same holds true with respect to the first and second back insulative layers 20 and 44.

The insulative layers may be etched away by any convenient technique. For example, if the insulative layer is silicon dioxide it may be wet etched away utilizing dilute hydrogen fluoride as the etchant. Other usable etchants when the insulative layer is silicon dioxide include fluorocarbons using plasma or reactive ion etching.

When the insulative layer is, for example, silicon nitride, it may be removed by being etched with phosphoric acid or fluorocarbons using plasma or reactive ion etching. The slab itself, when silicon, may be etched by utilizing hot NaOH, or better KOH (50°–80° C.), or ethylene-diamine with pyrocatechol. This is generally what is referred to as a wet etching process. Such wet etching generally provides anisotropic etching of the silicon from a (100) plane following the crystalline (111) planes.

Generally, when the insulative layers are silicon dioxide they are produced by exposure to damp oxygen at a temperature which falls within a range from about 900° C. to about 1100° C. for from about 1 hour to about 16 hours. By controlling the temperature and oxidation time one can control the thickness of the insulative layers. Such is generally well known from integrated circuit processing technology. Silicon nitride layers can also be used to provide pattern definition and can be formed by chemical vapor deposition.

FIG. 12 illustrates an embodiment of the present invention wherein an electrolytic medium 50 has been put into the well 28, by a convenient technique. One convenient technique to deposit the electrolytic medium 50 in the wells 28 is the use of ink-jet printers type apparatus wherein the ink normally used in such apparatus is replaced by the electrolytic medium 50 and the paper is replaced by the slab 12 with the wells 28. The electrolytic medium 50 can be a liquid, can be a hydrogel, or can be a solid conductive electrolyte, for example, a solid polymer electrolyte. Still referring to FIG. 12 it will be seen that a barrier 52 may be used to cover the well 28. Such a barrier will generally be of a construction sufficient to introduce a species into the electrolytic medium 50 on being contacted with a chemical moiety on its outfacing side. The species and the moiety are not necessarily the same. The barrier 52 will also generally prevent the entrance of interfering chemicals into the well 28.

Any of a number of different types of electrolytic media 50 can be utilized. For example, the electrolytic medium 50 can be a solution, e.g., a water based solution. Alternatively, the electrolytic medium 50 can be a hydrogel. Preferable, however, particularly for voltammetric measurements, are solid electrolytes, including solid polymeric electrolytes such as Nafion (a trademark of DuPont) which is part of a class of solid polymeric ion exchangers which conduct ions upon exposure to water. Probably the best known examples are membranes made from polystyrene with fixed negative sites (sulfonate, carboxylate or phosphonate) or fixed positive sites (quaternary ammonium or quaternary phosphonium). Selection as far as ions are concerned with these materials is almost exclusively on the basis of charge and for ions with the same charge discrimination is very slight. For voltammetric sensing the use of these materials is new. Other examples of solid polymeric electrolytes besides Nafion (which a is perfluorinated ionomer) are sulfonated styrene-divinyl benzene resins and divinyl napthalene sulfonic acid polymer.

Such polymers are characterized chemically and physically in that they have a hydrophobic nature with ionic (hydrophilic) clusters inside. They conduct ions upon hydration. They exclude co-ions up to the Donnan failure point at which stage ions of both types can penetrate into the resin. Neutral molecules can diffuse readily through such membranes and especially large organic molecules can dissolve within the more hydrophobic resins.

Resins can also be used as reference solutions (see, for example, French patent publication No. 2,158,905). These ion exchange resins have been used as the electrolytic medium for a potentiometric $CO_2$ sensor (see, for example, U.S. Pat. No. 3,730,868).

Useful gels for incorporation within the sensor structure include, without limitation: methylcellulose, polyvinyl alcohol, agar, carboxycellulose, gelatin, agarose, deionized gelatin, polyacrylamide, polyvinyl pyrrolidone, polyhydroxyethylacrylate, poly-2-hydroxyethyl methacrylate, and polyacrylic acid. They are characterized in that they constitute thickened (more viscous)

solutions. They are hydrophilic in natural and include synthetic polymeric film forming materials.

The electrolytic medium can alternatively be selected from a family of inorganic oxide solid proton conductors, e.g., hydrogen uranyl phosphate, protonated $\beta''$-alumina, zirconium phosphates or antimonic acids.

In the embodiments illustrated the barrier 52 can be any convenient polymer. It is generally preferred that the encapsulation material be such as to be impermeable to water vapor so that the water content of the solid electrolyte remains relatively constant whereby the properties of the gas sensor remain relatively constant with time. The barrier 52 may be, for example, in the nature of a membrane. The barrier 52 provides entry into the microsensor 10 of a selected moiety in response to contact of a selected species with its outfacing surface. Either the selected species will pass through the barrier 52 and will then constitute the selected moiety, or contact of the selected species with the barrier 52 will lead to the introduction of a different moiety into the microsensor 10. The barrier 52 is generally at least substantially impermeable to the electrolytic medium 50 to prevent escape and/or mixing with any analyte solution exterior of the barrier 52.

The barrier 52 may encapsulate the entire microsensor 10. Alternatively, the barrier 52 may only cover the sensing area, or part or all of the front surface 14. It may be desirable to encapsulate the remainder of the microsensor 10, or even all of the microsensor 10 including the barrier 52, as a protection against contamination. Generally, an inert encapsulating layer (not shown) will serve the purpose. The encapsulating layer, when present, must provide access (via, for example, pores or holes therethrough) to the barrier 52. It can be formulated as can the barrier 52.

A number of materials may serve as the barrier 52. For example, the barrier 52 can comprise a gas permeable liquid impermeable membrane. This is useful in the situation wherein the sensor is used in a liquid to detect dissolved gases, for example, if the microsensor 10 is utilized in blood.

Other types of materials for utilizing as the barrier 52 are teflon membranes, silicone rubber membranes, silicon polycarbonate rubber membranes, mylar, nylon 6, polyvinyl alcohol, polyvinyl chloride, methylcellulose, cellulose acetate, high density polyethylene, polystyrene, natural rubber, fluorosilicone, dimethylsilicon rubber, any appropriately perforate photoresist polymer, and dimethylsilicon. It is generally preferred that the membranes utilized be solution castable so as to make fabrication of the membrane more easily accomplished.

The barrier 52 can be constructed by, for example solution casting, separate casting on a different substrate and physical transfer, heat shrinking in place, solution casting utilizing an ink-jet printer, spin coating, or dip coating. If the barrier 52 is in the nature of uniform latex microspheres, made for example of polystyrene, styrene-butydiene, or Teflon (trademark of DuPont), such microspheres can be placed in position utilizing an ink-jet like technique, by dipping, by solvent spraying, or the like. If the barrier 52 is of the nature of or includes activated carbon or similar materials it can be placed in position by ink-jet type printing, solvent casting, or the like. If the barrier 52 includes, for example, permanganate coated alumina or other substance which serves to remove nitric oxide, it can be placed in position similarly to the carbon particles.

A convenient embodiment of the present invention, particularly useful when the slab 12 is a silicon slab, is to oxidize the slab 12 to produce a silicon dioxide layer 18,20 of a first thickness on the front and back sides 14,16 of the slab 12 polished on both sides. A front photoresist layer 22 is deposited on the silicon dioxide layer 18 on the front side 14 of the slab 12. The photoresist layer is deposited in the manner usual to the integrated circuit (IC) processing art. The front photoresist layer 22 is then exposed with a prerequisite pattern and then developed and hardened with heat in accordance with the standard procedures of the IC art to produce the positive front photoresist layer 22 having at least one hole 24 therethrough exposing a portion 26 of the silicon dioxide layer 18 therebehind.

The exposed portion of the silicon dioxide layer is then etched through by the methods previously discussed. The photoresist layer 22 is then removed by chemical dissolution or polymer ashing techniques.

Next, a well 28 is etched into the slab beneath where the patterned portion 26 of the silicon dioxide layer 18 has been etched through, the well 28 extending into the slab 12 and ending in a well bottom 30 at a location intermediate the front and back sides 14 and 16 of the slab. The etching again is by the techniques previously discussed.

The remaining photoresist layer 22 is removed by chemical dissolution or polymer ashing techniques.

The slab 12 is oxidized sufficiently to increase the thickness of the combined silicon dioxide layer 18,20 and to extend the silicon dioxide layer 18,20,32 to cover the surface of the well 28. The thickness of the silicon dioxide layer 32 on the surface of the well 28 is restricted to be less than the thickness of the silicon dioxide layer elsewhere.

A back photoresist layer 34 is deposited on the back side 16 of the slab 12 in contact with the back silicon dioxide layer 20 as thickened by formation of the silicon dioxide layer 32.

The back photoresist layer 34 is exposed through a patterned mask, developed, and bake hardened to produce a positive back photoresist layer 34 having at least one opening 36 therethrough exposing a part 38 of the silicon dioxide layer 20 therebehind, the opening 36 being aligned with the well 28. Utilizing etching techniques as described above the silicon dioxide layer 20 is etched through the exposed (patterned) part 38 of the silicon dioxide layer 20 and the photoresist layer 34 is chemically removed.

Figure 7:
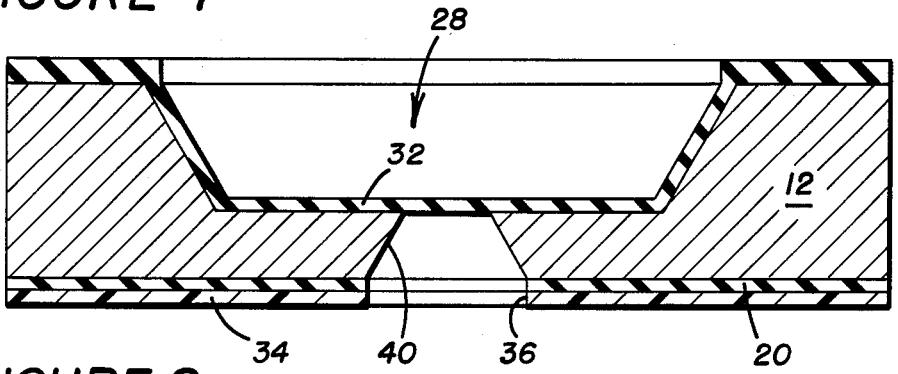
FIG. 7 illustrates the slab of FIG. 6, wherein the silicon has been anisotropically etched from the back side to the silicon dioxide layer at the bottom of the well.

A passage 40 is etched into the slab 12 beneath where the exposed part 38 of the silicon dioxide layer 20 has been etched through. The passage 40 extends into the slab 12 to terminate at the silicon dioxide layer 32 in the well 28. The etching again is by the methods previously discussed. If desired, and as illustrated in FIG. 7, the photoresist layer 34 can be removed after etching into the slab 12 has been completed.

The slab 12 is oxidized to increase the thickness of the silicon dioxide layer other than where the passage 40 terminates, and to extend the silicon dioxide layer to cover the surface of the passage 40. The oxidation is again by the methods previously discussed.

A conductor 46 is then deposited in the passage 40 in contact with the silicon dioxide layer 32. The conductor may be deposited by any of the methods set forth previously. Generally this will also result in the depositing of a conductor, for example, aluminum, along the back side 16 of the slab 12 in contact with the silicon dioxide layer 20. The conductor may be any of a number of materials to provide the best electrochemical properties, but may be a sandwich of various conductors wherein one often will be aluminum for purposes of economy and ease of construction. The conductor can be selectively removed from the silicon dioxide layer 20 by an appropriate technique, for example by patterning techniques whereby patterns of electronic connections can be made to a plurality of the wells 28 in the slab 12.

Various types of conductors 46 can be used as sensing electrodes. These include, for example, electrodes 18 of platinum, platinum black, silver, gold, iridium, palladium, palladium/silver, iridum dioxide, platinum black-away sufficiently to expose the conductor 46. In such an instance it will be desirable to further deposit an auxiliary conductor (e.g., aluminum or titanium) in the passage 40 in contact with the electrode (the first conductor 146), the auxiliary conductor extending to adjacent the back side 16 of the slab 12.

As will be seen by reference to FIG. 12 an integrated circuit 54 may be constructed on the back side 16 of the slab 12 utilizing conventional integrated circuitry technology. The integrated circuit 54 will be in electrical communication with and serve as an adapter to process signals from the conductor 46, or from the auxiliary conductor, when such is present.

TABLE 1

| Gas | Electrocatalyst | Electrolyte | Potential | Sensitivity (Detection Limit*) |
|---|---|---|---|---|
| CO | Platinum-catalyzed Teflon-bonded diffusion electrode | 3.4 M $H_2SO_4$ | 1.2 V vs. NHE | 10 $\mu$A/ppm (0.2 ppm) |
| CO | Platinoid black catalyst with Teflon binder | Hydrated solid polymer (Nafion) | 1.15 V vs. NHE | 2.2 $\mu$A/ppm (0.9 ppm) |
| (CO) | Gold-catalyzed Teflon-bonded diffusion electrode | 4 M $H_2SO_4$ | (1.4 V vs. NHE) | (0.03 $\mu$A/ppm) |
| NO | Gold catalyzed Teflon-bonded | 4 M $H_2SO_4$ | >1.2 V vs. NHE | 7 $\mu$A/ppm (0.3 ppm) |
| NO | Graphite with Teflon binder | Hydrated solid polymer (Nafion) | 1.25 V vs. NHE | 2.6 $\mu$A/ppm (0.8 ppm) |
| $NO_2$ | Graphite with Teflon binder | Hydrated solid polymer (Nafion) | 0.75 V vs. NHE | −2.9 $\mu$A/ppm (0.7 ppm) |
| $NO_2$ | Gold-catalyzed Teflon-bonded diffusion electrode | 4 M $H_2SO_4$ | <1.0 V vs. NHE | −8 $\mu$A/ppm (0.25 ppm) |
| $H_2S$ | Gold-catalyzed Teflon-bonded diffusion electrode | 28% $H_2SO_4$ | 1.45 V vs. NHE | 46 $\mu$A/ppm (40 ppb) |
| $N_2H_4$ | Gold-catalyzed Teflon-bonded diffusion electrode | 23% KOH | 1.1 V vs. NHE | 40 $\mu$A/ppm (50 ppb) |
| $CH_4$ | Teflon-bonded platinum black electrode | 2 M $NaClO_4$ in $\gamma$-butyrolactane | 0.8 V vs. Ag/AgCl | 1 $\mu$A % $CH_4$ (3000 ppm) |
| $O_2$ | Gold (cathode) | Alkaline | −0.6 to −1.0 V vs. $Ag/Ag_2O$ anode** | 0.05 $\mu$A/% $O_2$ (0–100% $O_2$) |
| $O_2$ | Ultrathin electrode (gold?) | Alkaline | Lead anode** | 2.5–3 nA/ppm $O_2$ (0.1 ppm to 100% $O_2$) |
| $H_2$ | Platinum black powder | Antimonic acid | Platinum black counter electrode** | 50 $\mu$A/% $H_2$ (400 ppm) |

*Detection limit (minimum detectable quantity) is calculated as the value yielding a signal-to-noise ratio of 2, using a typical noise level 1 $\mu$A of amperometric gas sensors.
**Quasi-amperometric (polarographic), no reference.
NHE = normal hydrogen electrode.

/paladium, platinum oxide, and mixtures thereof, electronically conductive polymers, and generally any of the electrodes normally utilized in electro- chemical measurements. A sensing electrode will generally be chosen which is responsive to a particular gaseous species. Various conventional materials can be utilized as counter electrodes and as reference electrodes. Table 1 sets forth, as examples only, a short list of gases, and electrochemical systems which have been used to determine them.

Finally, the silicon dioxide layer in the well bottom 30 is etched sufficiently to expose the conductor 46, the etching normally being controlled so as to not expose the slab 12.

It is also possible, and often desirable for economy, to only deposit a small amount of the conductor (which may be, for example, Pt, Pd, Au, or the like) in the passage 40, generally only enough to provide the desired electrode surface where the passage 40 meets the well 28 once the silicon dioxide layer 32 has been etched The drawings illustrate an embodiment wherein only a single passage 40 is connected to the bottom of a well 28. It is also possible, and often desirable, to utilize precisely the method steps set out above to form several passages 40 at the same time to the same or different wells, or to do so sequentially. Furthermore, the drawings illustrate the formation of a single well 28 with only a single passage 40 communicating therewith. In accordance with the present invention it is anticipated that a plurality of wells 28 can be formed in a single slab 12, preferably simultaneously, again utilizing precisely the methods set forth above. Thus, 2, 5, 10 or even hundreds of wells 28 can be formulated in a single slab 12 at one and the same time.

Because of anisotropic etching processes the passage 40 and the well 28 are each wider at the back surface of the slab 12 than they are as they proceed into the body of the slab 12. As a result, if more than one passage 40 extends to a single well bottom 28 the passages 40 must be so placed whereby their broader or base ends will not short to one another.

FIGS. 13-20 illustrate the steps in another convenient embodiment of the invention, namely one wherein the well 28 is not formed in the slab but, instead, an electrode is provided on the front side 114 of a slab 112. In a particular embodiment when the slab 112 is a silicon slab, it can be oxidized to produce a silicon dioxide layer 118,120 of a first thickness on the front and back sides 114,116 of the slab 112.

A back photoresist layer 134 is deposited on the back side 116 of the slab 112 in contact with the back silicon dioxide layer 120.

The back photoresist layer 134 is exposed through a patterned mask, deveoped, and bake hardened to produce a positive back photoresist layer 134 having at least one opening 136 therethrough exposing a part 138 of the silicon dioxide layer 120 therebehind. Utilizing etching techniques as described above the silicon dioxide layer 120 is etched through the exposed (patterned) part 138 of the silicon dioxide layer 120 and the photoresist layer 134 is chemically removed.

Figure 15:
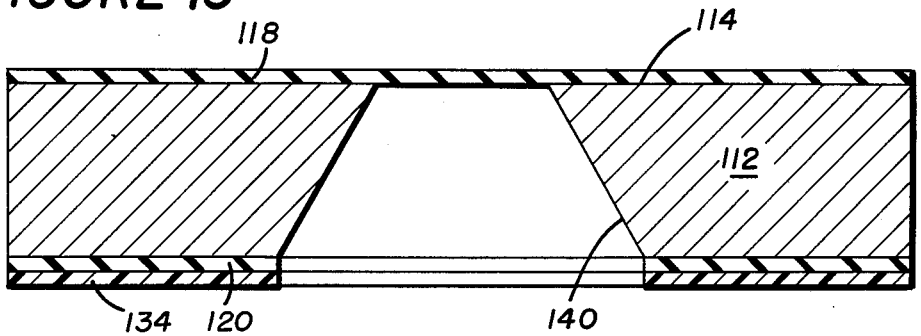
FIG. 15 illustrates the slab of FIG. 14, wherein the silicon has been anisotropically etched from the back side to the silicon dioxide layer on the front side.
Figure 16:
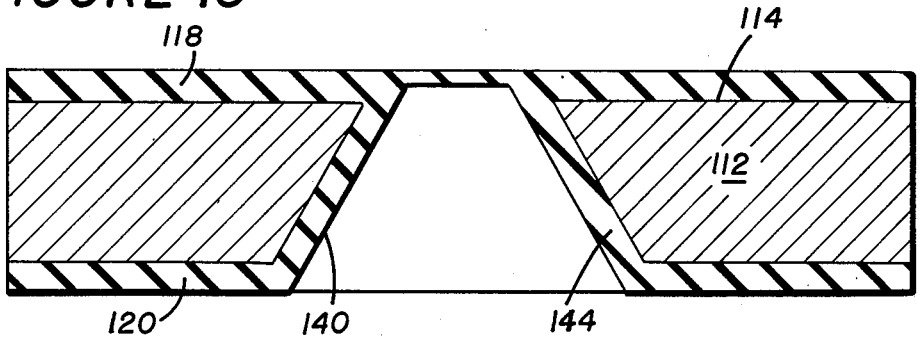
FIG. 16 illustrates the slab of FIG. 15, following further oxidation to thicken the silicon dioxide layer and to oxidize the passage leading to the front side.
Figure 17:
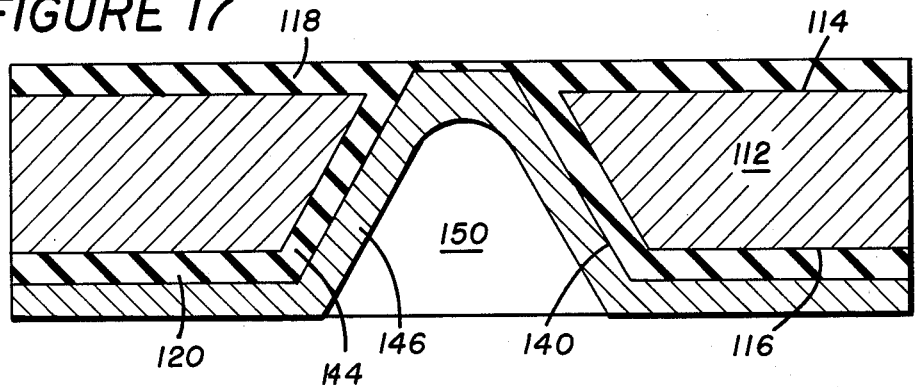
FIG. 17 illustrates the slab of FIG. 16 having a metal deposited on the back side thereof and into the passage leading to the first side.
Figure 18:
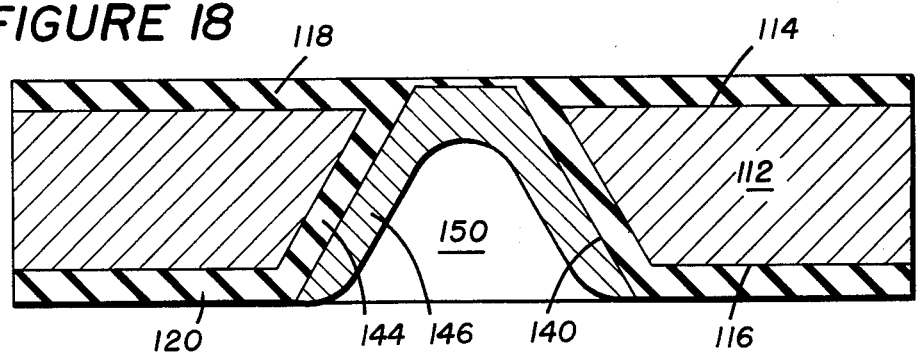
FIG. 18 illustrates the slab of FIG. 17 after excess metal has been stripped from the back silicon dioxide layer.
Figure 19:
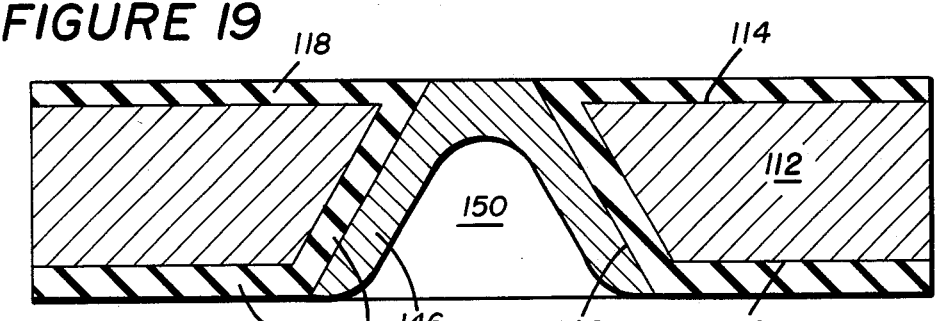
FIG. 19 illustrates a completed slab produced by etching of the silicon dioxide layer sufficiently to expose a conductor in the passage to the front side.

A passage 140 is etched into the slab 112 beneath where the exposed part 138 of the silicon dioxide layer 120 has been etched through. The passage 140 extends into the slab 112 to terminate at the silicon dioxide layer 118 on the front surface 114. The etching again is by the methods previously discussed. While the photoresist layer 34 will generally have been chemically removed prior to etching into the slab 112, it is also possible to remove the photoresist layer 134 after etching into the slab 112, for example as illustrated in FIG. 15.

The slab 112 is oxidized to increase the thickness of the silicon dioxide layer 118,120 other than where the passage 140 terminates (since there is no silicon to oxidize there), and to extend the silicon dioxide layer to cover the surface of the passage 140. This provides a silicon dioxide coating 144 on the surface of the passage 140. The oxidation is again by the methods previously discussed.

A conductor 146 is then deposited in the passage 140 in contact with the silicon dioxide layer 118. The conductor 146 may be deposited by any of the methods set forth previously. This will generally also result in the depositing of a conductor along the back side 116 of the slab 112 in contact with the silicon dioxide layer 120. Generally the conductor 146 can be as discussed with respect to previous embodiments of the invention. And, it can be removed from the silicon dioxide layer 120 as discussed previously.

Finally, the front silicon dioxide layer 118 is etched sufficiently to expose the conductor 146, the etching normally being controlled so as to not expose the slab 112.

As discussed with respect to other embodiments of the present invention it is possible to deposit only a small amount of the conductor in the pasage 140, generally only enough to provide the desired electrode surface where the passage 140 meets the front side 114 of the slab 12 once the silicon dioxide layer 118 has been etched away sufficiently to expose the conductor 146. In such an instance it may be desirable to further deposit an auxiliary conductor in the passage 140 in contact with the electrode (the first conductor 146).

In certain instances, with respect to this embodiment and to the previously described embodiments, it will also be desirable to deposit an insulative material, for example a polymeric material such as a polyimide, in a dimple 150 which may be left by the conductor 146 or by the auxiliary conductor, in those instances where it is present. The insulative material is in the nature of a plug 152 and serves to provide strength and backing for the conductor 146.

Figure 20:
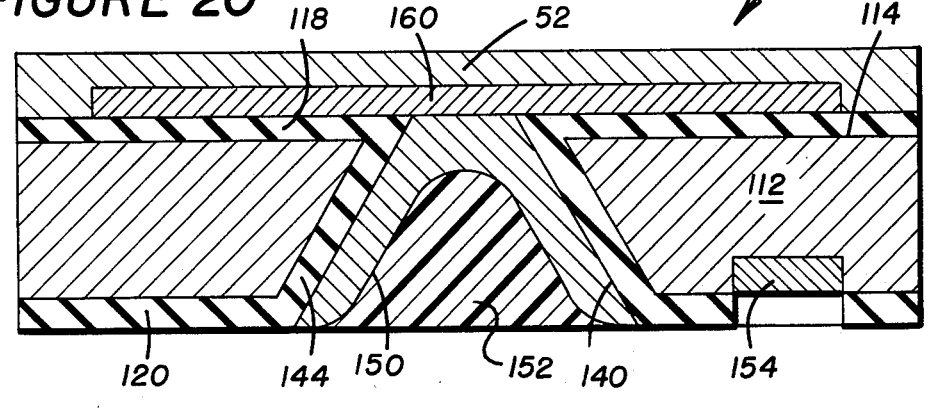
FIG. 20 illustrates a completed electrochemcal cell produced as illustrated in FIGS. 13-19 with integrated circuitry on the back side of the slab.

As will be seen by reference to FIG. 20 an integrated circuit 154 may be constructed on the back side 116 of the slab 112 utilizing conventional integrated circuit technology. The integrated circuit 154 will be in electrical communication with and serve as an adapter to process signals from the conductor 146, or from the auxiliary conductor, when such is present.

The drawings illustrate an embodiment where only a single passage 140 is connected to the front side 114 of the slab 112. It is also possible, and often desirable, to utilize precisely the method steps set out above and illustrated in FIGS. 13-19 to form several passages 140 at the same time, or to do so sequentially.

It should be noted that the embodiment illustrated in FIGS. 13-20 is generally parallel to the steps illustrated in FIGS. 5-12 and if one considers the bottom 30 of the well 28 (in FIGS. 5-12) to be equivalent to the front side 114 of the slab 112, the method steps are then identical.

Referring to FIG. 20 it will be seen that an electrolytic medium 160 may be positioned upon the front masking layer 118 and in contact with the conductor 146. Additional electrodes may also be in contact with the electrolytic medium 160 to provide a complete electrochemical cell 110. The electrolytic medium 160 can be a liquid, it can be a hydrogel, or it can be a solid conductive electrolyte, for example a solid conductive polymer electrode.

Industrial Applicability

The present invention is useful for forming microelectrochemical cells in silicon slabs or wafers and also for forming arrays of such cells in a single silicon slab or wafer. Such cells are useful for detecting gases, liquids and dissolved species. Also, electrodes can be produced which have flat exposed surfaces and which can form portions of planar sensors.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A method of constructing an electrochemical cell in a crystalline slab having front and back sides facing generally away from one another, comprising:
  (a) providing first front and first back masking layers of a first thickness covering, respectively, said front and back sides and a front resist layer covering said first front layer, said front resist layer having at least one hole therethrough exposing a portion of said first front masking layer therebehind;
  (b) etching a well through said exposed portion of said first front masking layer and extending into said slab to a location intermediate said front and back sides;
  (c) forming a second front masking layer covering said front side and said well, said second front masking layer being of a second thickness which is less than said first thickness;

(d) providing a back resist layer covering said first back masking layer, said back resist layer having at least one opening therethrough exposing a part of said first back masking layer therebehind, said opening being aligned opposite said well;

(e) etching a passage through said exposed part of said first back masking layer and extending into said slab to terminate at said second front masking layer in said well;

(f) providing a third front masking layer covering said front side and said well other than opposite where said passage terminates at said second front masking layer;

(g) depositing a conductor in said passage; and (h) etching said second and third front masking layers away opposite to said passage sufficiently to expose said conductor.

2. A method as set forth in claim 1, wherein said slab comprises a semiconductor, said masking layers are insulative and said etching step (h) is controlled to not etch away sufficient of said masking layers to expose said slab; and further including, between steps (f) and (g):

providing a second back insulative layer covering said back side and said passage other than where said passage terminates at said second front masking layer.

3. A method as set forth in claim 2, wherein said masking layers are provided by chemical vapor deposition.

4. A method as set forth in claim 2, wherein said slab comprises silicon and said masking layers are provided by exposure to oxygen at elevated temperature.

5. A method as set forth in claim 4, wherein said etching of said masking layer is by chemical etching with a solution of hydrofluoric acid and said etching of said slab is by an aqueous alkali metal hydroxide solution.

6. A method as set forth in claim 4, wherein said masking layers are provided by exposure to damp oxygen at a temperature which falls within a range from about 900° C. to about 1100° C. or from about 1 hour to about 16 hours.

7. A method as set forth in claim 4, wherein said first, second and third front masking layers and said first and second back masking layers are integral and comprise silicon dioxide.

8. A method as set forth in claim 1, further including: introducing an electrolytic medium into said well.

9. A method as set forth in claim 8, further including: closing said well with a liquid impervious barrier.

10. A method as set forth in claim 2, wherein said conductor comprises an electrode and further including:

depositing an auxiliary conductor in said passage in contact with said electrode, said auxiliary conductor extending to adjacent said back side.

11. A method as set forth in claim 10, further including:

removing excess of said conductor from said back side.

12. A method as set forth in claim 11, further including:

constructing an integrated circuit on said back side in electrical communication with and adapted to process signals from said conductor.

13. A method of constructing an electrochemical cell from a crystalline slab having front and back sides facing generally away from one another, comprising:

(a) providing first front and first back masking layers covering, respectively, said front and back sides;

(b) providing a back resist layer covering said first back masking layer, said back resist layer having at least one opening therethrough exposing a part of said first back masking layer therebehind;

(c) etching a passage through said exposed part of said first back masking layer and extending into said slab to terminate at said first front masking layer;

(d) depositing a conductor in said passage;

(e) forming a second front masking layer covering said front side other than where said passage terminates at said first front masking layer; and (f) etching said first and second front masking layers away opposite to said passage sufficiently to expose said conductor.

14. A method as set forth in claim 13, wherein said slab comprises a semiconductor, said masking layers are insulative and said etching step (f) is controlled to not etch away sufficient of said masking layers to expose said slab; and further including, between steps (c) and (d):

providing a second back insulative layer covering said back side and said passage other than where said passage terminates at said second front masking layer.

15. A method as set forth in claim 14, wherein said masking layers are provided by chemical vapor deposition.

16. A method as set forth in claim 14, wherein said slab comprises silicon and said masking layers are provided by exposure to oxygen at elevated temperature.

17. A method as set forth in claim 16, wherein said etching of said masking layer is by chemical etching with a solution of hydrofluoric acid and said etching of said slab is by an aqueous alkali metal hydroxide solution.

18. A method as set forth in claim 16, wherein said masking layers are provided by exposure to damp oxygen at a temperature which falls within a range from about 900° C. to about 1100° C. or from about 1 hour to about 16 hours.

19. A method as set forth in claim 16, wherein said masking layers are integral and comprise silicon dioxide.

20. A method as set forth in claim 14, wherein said conductor comprises an electrode and further including:

depositing an auxiliary conductor in said passage in contact with said electrode, said auxiliary conductor extending to adjacent said back side.

21. A method as set forth in claim 20, further including:

removing excess of said conductor from said back side.

22. A method as set forth in claim 21, further including:

constructing an integrated circuit on said back side in electrical communication with and adapted to process signals from said conductor.

23. A method of forming an electrolytic cell in a silicon slab having front and back sides facing generally away from one another, comprising:

(a) oxidizing said slab to produce a silicon dioxide layer of a first thickness on said front and back sides;
(b) depositing a front resist layer on said silicon dioxide layer on said front side having at least one hole therethrough exposing a portion of said silicon dioxide layer therebehind;
(c) etching through said exposed portion of said silicon dioxide layer;
(d) etching a well into said slab beneath where said exposed portion of said silicon dioxide layer has been etched through, said well extending into said slab and ending in a well bottom at a location intermediate said front and back sides of said slab;
(e) removing said front resist layer;
(f) oxidizing said slab sufficiently to increase the thickness of said silicon dioxide layer, and to extend said silicon dioxide layer to cover the surface of said well, the thickness of the silicon dioxide layer on the surface of said well being less than the thickness of said silicon dioxide layer elsewhere;
(g) depositing a back resist layer on said back side having at least one opening therethrough exposing a part of said silicon dioxide layer therebehind, said opening being aligned with said well;
(h) etching through said exposed part of said silicon dioxide layer;
(i) etching a passage into said slab beneath where said exposed part of said silicon dioxide layer has been etched through, said passage extending into said slab to terminate at said silicon dioxide layer in said well;
(j) removing said back resist layer;
(k) oxidizing said slab sufficiently to increase the thickness of said silicon dioxide layer other than where said passage terminates, and to extend said silicon dioxide layer to cover the surface of said passage;
(l) depositing a conductor in said passage; and
(m) etching said silicon dioxide layer on said well bottom sufficiently to expose said conductor, said etching being controlled to not expose said slab.

24. A method as set forth in claim 23, further including:
introducing an electrolytic medium into said well.

25. A method as set forth in claim 24, further including:
closing said well with a liquid impervious barrier.

26. A method as set forth in claim 23, wherein said etching of said silicon dioxide layer is by chemical etching with a solution of hydrofluoric acid and said etching of said slab is by an aqueous alkali metal hydroxide solution.

27. A method as set forth in claim 23, wherein said silicon dioxide layers are provided by exposure to damp oxygen at a temperature which falls within a range from about 900° C. to about 1100° C. or from about 1 hour to about 16 hours.

28. A method as set forth in claim 23, wherein said conductor comprises an electrode and further including:
depositing an auxiliary conductor in said passage in contact with said electrode, said auxiliary conductor extending to adjacent said back side.

29. A method as set forth in claim 23, further including:
removing excess of said conductor from said back side.

30. A method as set forth in claim 29, further including:
constructing an integrated circuit on said back side in electrical communication with and adapted to process signals from said conductor.

31. A method of forming an electrolytic cell from a silicon slab having front and back sides facing generally away from one another, comprising:
(a) oxidizing said slab to produce a silicon dioxide layer of a first thickness on said front and back sides;
(b) depositing a back resist layer on said back side having at least one opening therethrough exposing a part of said silicon dioxide layer therebehind;
(c) etching through said exposed part of said silicon dioxide layer;
(d) etching a passage into said slab beneath where said exposed part of said silicon dioxide layer has been etched through, said passage extending into said slab to terminate at said silicon dioxide layer on said front side;
(e) removing said back resist layer;
(f) oxidizing said slab sufficiently to increase the thickness of said silicon dioxide layer other than where said passage terminates, and to extend said silicon dioxide layer to cover the surface of said passage;
(g) depositing a conductor in said passage; and
(h) etching said silicon dioxide layer sufficiently to expose said conductor opposite the passage, said etching being controlled to not expose said slab.

32. A method as set forth in claim 31, wherein said etching of said silicon dioxide layer is by chemical etching with a solution of hydrofluoric acid and said etching of said slab is by an aqueous alkali metal hydroxide solution.

33. A method as set forth in claim 31, wherein said silicon dioxide layers are provided by exposure to damp oxygen at a temperature which falls within a range from about 900° C. to about 1100° C. or from about 1 hour to about 16 hours.

34. A method as set forth in claim 31, wherein said conductor comprises an electrode and further including:
depositing an auxiliary conductor in said passage in contact with said electrode, said auxiliary conductor extending to adjacent said back side.

35. A method as set forth in claim 31, further including:
removing excess of said conductor from said back side.

36. A method as set forth in claim 35, further including:
constructing an integrated circuit on said back side in electrical communication with and adapted to process signals from said conductor.

* * * * *